United States Patent [19]

Blenkush et al.

[11] Patent Number: 4,934,655
[45] Date of Patent: Jun. 19, 1990

[54] SHUTOFF VALVE ASSEMBLY

[75] Inventors: Brian J. Blenkush, Maple Grove; David W. Meyer, Jordon, both of Minn.

[73] Assignee: Colder Products Company, St. Paul, Minn.

[21] Appl. No.: 320,692

[22] Filed: Mar. 13, 1989

[51] Int. Cl.$^5$ .............................................. F16L 37/28
[52] U.S. Cl. ................................. 251/149.1; 251/149; 604/249; 604/256; 285/308
[58] Field of Search .................. 251/149, 149.1, 149.6; 604/905, 249, 256; 285/305, 308

[56] References Cited

U.S. PATENT DOCUMENTS

| | | | |
|---|---|---|---|
| 2,318,965 | 5/1943 | Parker et al. | 251/149.1 |
| 3,334,860 | 8/1967 | Bolton, Jr. | 251/149.1 |
| 4,193,576 | 3/1980 | White | 251/149.6 |
| 4,421,296 | 12/1983 | Stephens | 251/149.6 |
| 4,436,125 | 3/1984 | Blenkush | 251/149.6 |
| 4,500,118 | 2/1985 | Blenkush | 285/247 |
| 4,541,457 | 9/1985 | Blenkush | 137/614.06 |
| 4,630,847 | 12/1986 | Blenkush | 285/29 |
| 4,700,744 | 10/1987 | Rutter et al. | 251/149.6 |
| 4,703,957 | 11/1987 | Blenkush | 285/239 |

OTHER PUBLICATIONS

Colder Products Company Catalogue titled "Quick Coupling for Plastic Tubing," pp. 1-36, Exhibit A, 1989.
"Connect or Disconnect Fluid Lines at Full Operating Pressures", from Imo Industries, Inc., Aeroproducts Division, 4223 Monticello Blvd., Cleveland, OH 44121, 1 page advertisement, 1989.

Primary Examiner—A. Michael Chambers
Attorney, Agent, or Firm—Merchant, Gould, Smith, Edell, Welter & Schmidt

[57] ABSTRACT

A shutoff valve (26) including a plunger (28) slidably mounted in a housing (30). The plunger (28) being slidable between an open and a closed position. The plunger (28) having a front end and a back end and defining a path flow of fluid therethrough. A back end (32) of the plunger (28) having inclined surfaces (50). Projections (34) extend from the back end (32) of the housing (30) and cooperate with the inclined surfaces (50) to bias the plunger (20) into the closed position.

9 Claims, 3 Drawing Sheets

SHUTOFF VALVE ASSEMBLY

Technical Field of the Invention

The present invention relates to a shutoff valve and in particular to a shutoff valve which utilizes an inclined surface cooperating with biasing members.

Background of the Invention

There are many applications where an inexpensive, disposable shutoff valve is needed. For example, many products are sold today in collapsible, disposable containers which are thrown away after use. The shutoff valves used with these containers often are not reliable or fail after a period of use.

There are numerous other uses for shutoff valve assemblies which are inexpensive but yet reliable. Shutoff valves are frequently used in fluid lines in medical and beverage dispensing applications. Such valves could also be used as a self-sealing drain valve or as a pressure relief valve. These are but a few of the numerous applications for such a valve.

One example of a disposable shutoff is a one piece, plastic valve molded to have the configuration of a coiled compression spring. A potential problem with this valve is possible failure due to food or liquid substances interfering with its operation. Additionally, the valve appears to exert less force in its extended state which would be the valve's closed position than in its compressed state which would be the valve's opened position.

The present invention solves these and many other problems associated with the prior art.

Summary of the Invention

The present invention relates to a shutoff valve comprising a housing having a back end and a front end. A plunger member is slidably mounted in the housing for slidable movement between an open position and a closed position. The plunger has a front end and a back end and defines a path for the flow of fluid therethrough. The back end of the plunger has inclined surfaces. Projections extend from the back end of the housing and cooperate with the inclined surfaces of the plunger to bias the plunger into the closed position. Seal means is provided for sealing the fluid flow path when the plunger is in the closed position.

In the preferred embodiment of the present invention, the shutoff valve comprises a two piece integrally molded valve housing and plunger. This greatly simplifies the manufacturing process. The unique design of the present invention also increases the manufacturing tolerances.

In addition, the preferred embodiment of the present invention eliminates the conventional compression spring design which is typically present in shutoff valve assemblies and which usually causes many of the problems associated therewith.

In alternative embodiments of the present invention, the plunger member might have different inclines such that the biasing force exerted on the plunger is varied as the projections contact the differing inclines of the plunger. In particular, the shutoff valve can be configured such that the biasing force resisting movement of the plunger into the opened position is greatest when the plunger is the closed position. Thus, the force required to initially open the valve is greater than the force required to fully open the valve once it is partially opened. This is opposite of the effect derived from a typical compression spring.

The degree of surface incline and the configuration and composition of the projections can be varied to select the desired biasing force.

One particular advantage of a preferred embodiment of the present invention is that it eliminates the requirement for any metal being present in the fluid flow path.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the invention.

Brief Description of the Drawings

In the drawings wherein like reference numerals indicate corresponding parts throughout the several views.

Detailed Description of a Preferred Embodiment

Figure 5:
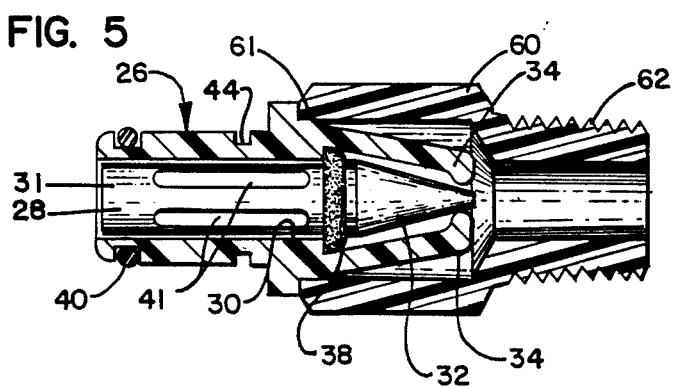
FIG. 5 is a cross sectional view of a shutoff valve in accordance with the principles of the present invention being used with a threaded adaptor assembly for threaded attachment to a fluid reservoir or conduit.
Figure 6:
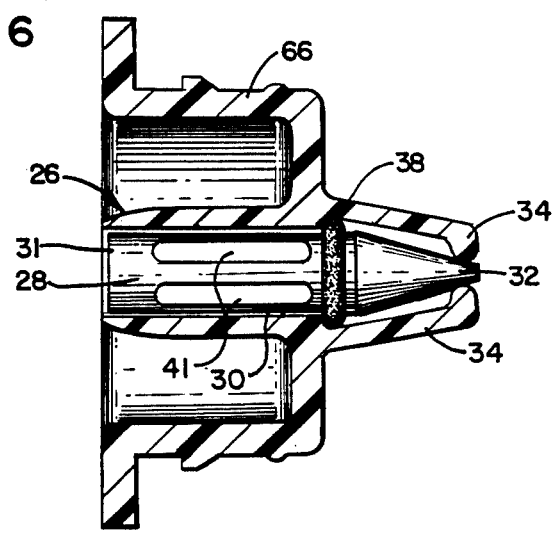
FIG. 6 is a cross sectional view of an embodiment of a shutoff valve in accordance with the principles of the present invention being used with a container attachment member for attachment to a container.
Figure 9:
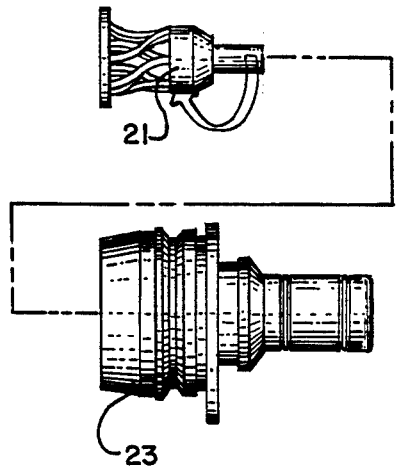
FIG. 9 is an elevational view of a prior art compression spring valve made as an integrally molded, one piece plastic unit, and configured for use with a container adaptor.
Figure 8:
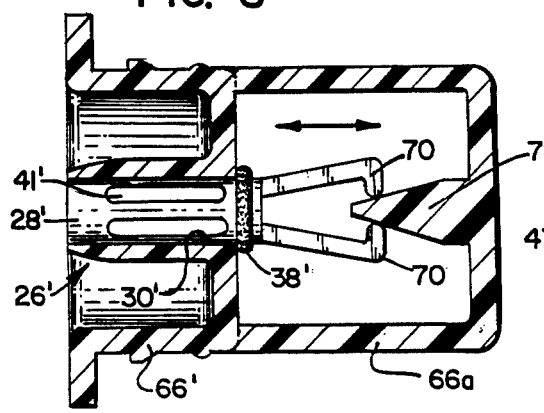
FIG. 8 is a sectional view similar to that of FIG. 6 illustrating an alternative embodiment of the present invention.

In referring now to the drawings, there is illustrated in FIGS. 1-4 an embodiment of a coupling assembly 20 including a male coupling member 22 and a female coupling member 24. The male coupling member 22 comprises a shutoff valve assembly 26 having a plunger 28 slidably mounted in a housing 30. A back end portion 32 of the plunger 28 has a conical configuration. Two axially extending elongated members 34 project from the back end of the housing 30 and include radially inwardly extending end portions 33 proximate their distal ends. In the application shown, a collar portion 36 circumferentially surrounds the shutoff valve assembly 26 and is suitably attached to a collapsible container 37. In this application, upon emptying the container 37, the container 37 and the male coupling member 22 can both be disposed of and quickly replaced by another container and its associated male coupling member for interconnection to the female coupling member 24 and its associated tubing. It will be appreciated that the female coupling member 24 may be interconnected to any number of fluid lines, reservoirs, containers, equipment, etc. Moreover, any number of well known female coupling designs can be used with the shutoff valve of the present invention. One such female coupling design is shown in U.S. Pat. No. 4,436,125 issued Mar. 13, 1984. The shutoff valve of the present invention can be used with male and female coupling members having numerous configurations. The shutoff valve assembly 26 is illustrated in FIGS. 5 and 6 as being used in other application. FIG. 8 illustrates an alternate embodiment of the present invention wherein the elongated biasing members are attached to the plunger and cooperate with a stationary inclined surface attached to the coupling member. FIG. 9 illustrates a prior art compression spring 21 which is used as a disposable shutoff valve with a container cover adaptor 23.

Figure 1:
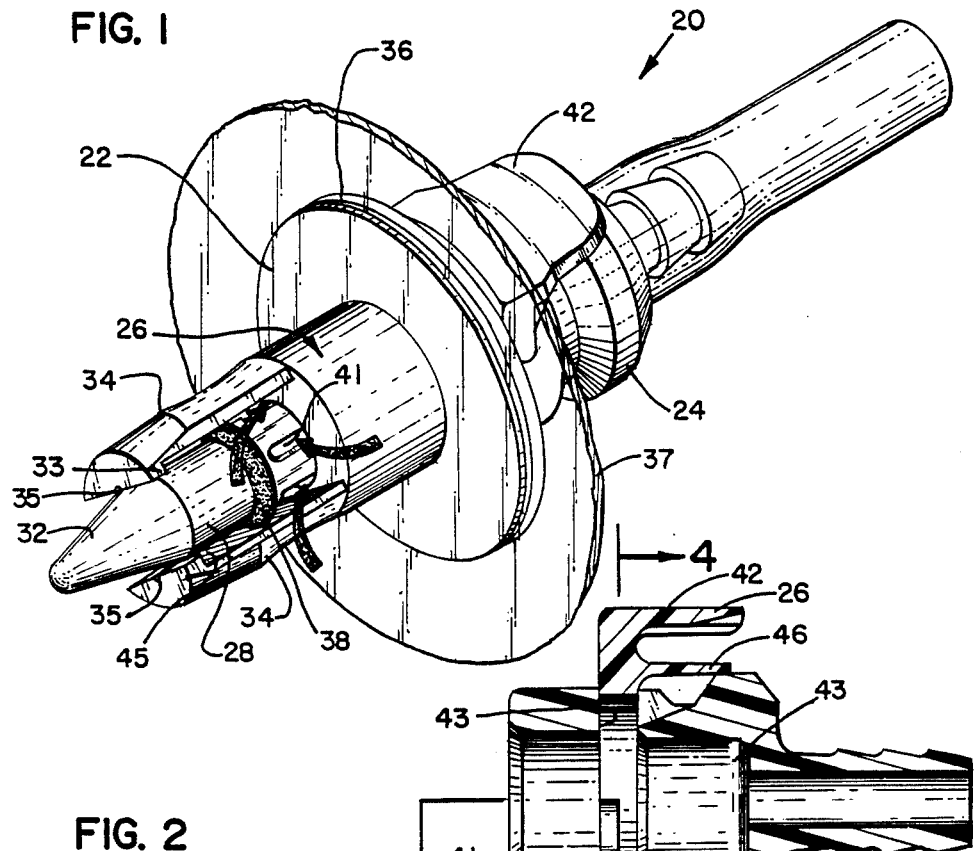
FIG. 1 is a perspective of a coupling assembly utilizing a preferred embodiment of a shutoff valve in accordance with the principles of the present invention, the coupling assembly being illustrated as interconnecting a tubular member to a collapsible container.
Figure 2:
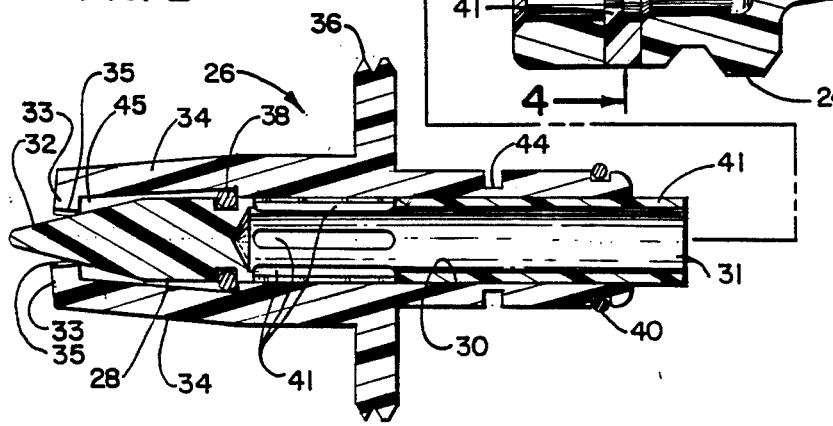
FIG. 2 is a cross sectional view of the coupling assembly shown in FIG. 1 in an uncoupled state.
Figure 3:
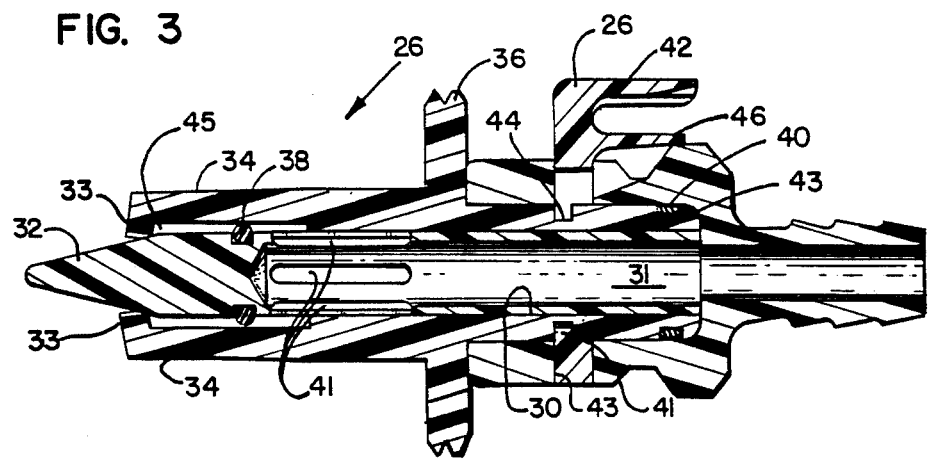
FIG. 3 is a cross sectional view of the coupling assembly shown in FIG. 1 in a coupled state.

Referring now more particularly to the drawings, the plunger 28 is slidable between a closed and opened positions as illustrated in FIGS. 2 and 3. In the opened position, the coupling assembly 20 defines a fluid pathway therethrough. In the closed position, an O-ring seal 38 cooperates with the plunger 28 and housing 30 to seal the fluid pathway. When the male coupling member 22 is inserted into the female coupling member 24, an O-ring seal 40 proximate a front end of the plunger 28 cooperates with an interior surface of the female coupling member 24 to provide a fluid tight seal therebetween.

Figure 4:
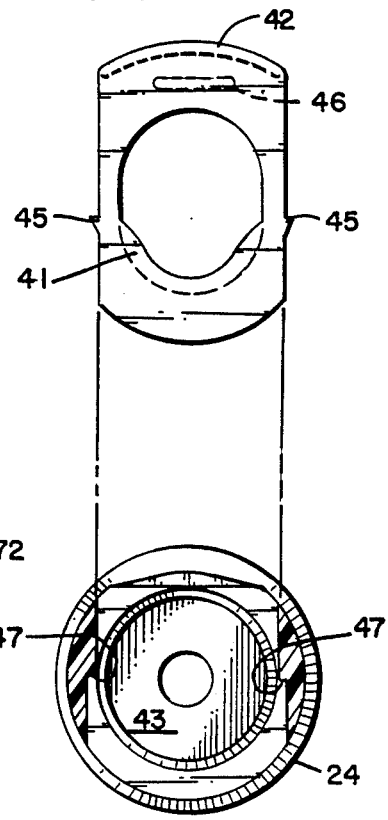
FIG. 4 is a sectional view as seen generally along line 4—4 of FIG. 2 illustrating the clip member removed from the female coupling member and in alignment with the slot of the female coupling member for insertion into the slot of the female coupling member.

In the embodiment of the female coupling shown, a locking collar, herein referred to as a clip member 42, is mounted in a slot 43 of the female coupling member for engaging a circumferential groove 44 proximate the front end of the plunger 28 such that the clip member 42 retains the coupling assembly 20 in a coupled state when fluid pressure is applied. As illustrated in FIG. 4 wherein the clip member 42 has been removed from the slot 43, the clip member includes projections 45 which cooperate with surfaces 47 along the side of the slot 43 to retain the clip member in the female coupling member 24. The clip member 42 is biased upwardly by a resilient member 46 as generally illustrated in FIGS. 2 and 3, such that upon insertion of the male coupling member 22 and alignment with the groove 44 in the male coupling member 22 with the clip member 42, an inner edge 41 of the clip member 22 moves up into the groove 44 so as to retain the male and female couplings in a coupled state. As previously indicated, any number of female coupling designs might be utilized with the shutoff valve of the present invention.

In the embodiment of the male coupling member 22 shown, the plunger 28 has a hollow tubular front end portion 31. The back end portion 32 is solid, a portion of which has a conical configuration and a portion of which has a cylindrical configuration. Elongated spaced apart apertures are defined in the walls of the tubular front end portion 31 just in front of the O-ring seal 38. The hollow tubular portion extends beyond the front end of the housing 30 such that as the male coupling member 22 is inserted into the female coupling member 24, the tubular front end portion 31 will engage a wall 43 of the female coupling member 24. Upon application of sufficient force to overcome the biasing effect of the projections 34, the plunger 28 is made to slide backward such that the apertures 41 are moved into a cavity 45 of the housing 30 so as to allow fluid flow therethrough. Moreover, the cavity is enlarged as the plunger 28 is moved backward since the conical portion of the plunger 28 forces the elongated members 34 radially apart. Upon removal of the male coupling member 22, the plunger 28 will be biased forward into its closed position.

The shutoff valve assembly is preferably made of a plastic with a rather high modulus of elasticity. Thus the elongated members 34 are resilient in that as they are forced radially apart or displaced by movement of the plunger 28, they tend to return to their at rest position, thereby exerting a force on the plunger 28 forcing it toward the front end of the male coupling 22. The greater the degree of incline of the back end portion 32 of the plunger 28, the more force which will be exerted axially as opposed to radially of the plunger. The force can also be varied by varying the elasticity of the elongated members 34 and their configuration. Typical types of plastic might be Delrin ® which is sold by Du Pont or Celcon ® which is sold by Celanese. Both of these products are acetal types of plastic. Another type of plastic which might be used is polysulfone.

Figure 7:
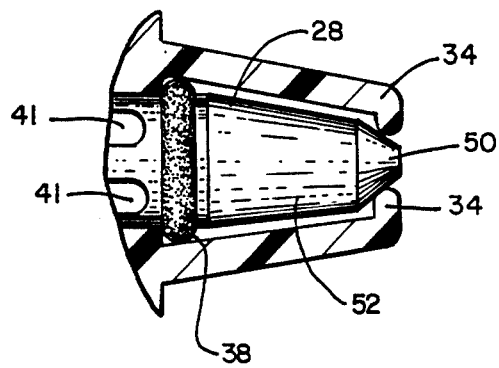
FIG. 7 is a partial sectional view illustrating the plunger of the shutoff valve as including two different degrees of inclined surfaces.

In the alternative embodiment shown in FIG. 7, the back end of the plunger 28 has two different conical portions 50, 52. The first conical portion has a greater incline such that the force exerted by the projections 34 is much greater than when the projections 34 rest on the conical portion 52. Accordingly, the shutoff valve of the embodiment shown in FIG. 7 exerts the greatest force when the shutoff valve is in the closed position and exerts less force when the shutoff valve is in the open position.

By varying the configuration of the projections and their end portions and by varying the surface incline as well as the type of plastic used in the modulus of elasticity, one can obtain desired biasing characteristics. It will be appreciated that the back end portion 32 of the plunger 28 can have alternate configurations from that shown in the preferred embodiments. For example, the back end portion might have a flat inclined or ramped surface. Moreover, elongated projections 34 might be varied in shape and composition. In the preferred embodiment, the elongated projections 34 are symmetrically disposed about the plunger 28. Further, in the preferred embodiment the projections 34 have a curvilinear alignment groove 35 for maintaining proper alignment between the projections 34 and the plunger 28.

As indicated before, the shutoff valve of the present invention has numerous applications. In FIG. 5, the shutoff assembly 26 is illustrated as being sonically welded at 61 to a threaded adaptor 60 for threaded attachment of the threaded portion 62 to a container, fluid line, or the like. Illustrated in FIG. 6 is an application wherein the shutoff valve 26 is attached to a container attachment 66 which in turn can be suitably attached to a disposable container or the like. Both of these embodiments are illustrated in the closed position. It will be appreciated, that the shutoff valve assembly 26 may be caused to move into the opened position in a fashion similar to that shown in FIGS. 1-3 or by any number of well known cooperating coupling arrangements.

Illustrated in FIG. 8 is an alternate embodiment of the present invention attached to a container attachment similar to that of FIG. 6, wherein elongated biasing members 70 are attached to the plunger 28' as opposed to the housing 30'. A conical structure 72 is supported by a container attachment portion 66a in alignment with the biasing members 70 of the plunger 28'. Accordingly, as the shutoff valve 26 is opened, the elongated biasing members 70 are spread apart as they slide along the surface of the conical structure 72 so as to be displaced from their rest position into a displaced position. As with the other embodiment, upon being so displaced, the elongated biasing members 70 exert a biasing force tending to bias the plunger 28' toward the closed position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A shutoff valve, comprising:
   (a) a housing having a back end and a front end;
   (b) a plunger slidably mounted in the housing, the plunger being slidable between an opened position and a closed position, the plunger having a front end and a back end and defining a path for the flow of fluid therethrough, the back end of the plunger having inclined surfaces;
   (c) projections extending from the back end of the housing, the projections slidably cooperating with the inclined surfaces to bias the plunger into the closed position; and
   (d) seal means for sealing the fluid flow path when the plunger is in the closed position.

2. A shutoff valve in accordance with claim 1, wherein the back end of the plunger has a conical configuration.

3. A shutoff valve in accordance with claim 2, wherein the projections are symmetrically disposed about the back end of the plunger.

4. A shutoff valve in accordance with claim 1, wherein the back end of the plunger has at least two different surface inclines.

5. A shutoff valve in accordance with claim 1, wherein the back end of the plunger has at least two different conical portions.

6. A shutoff valve in accordance with claim 1, wherein the projections extend axially from the back end of the housing and include radially, inwardly extending end portions proximate their distal ends, the radially, inwardly extending end portions being spaced apart by less than the diameter of the back end of the plunger, the end portions cooperating with the back end of the plunger to bias the plunger toward the closed position.

7. A coupling assembly, comprising:
   (a) a female coupling member having a front end and a back end and defining a path for the flow of fluid therethrough;
   (b) a male coupling member having a front end and a back end and defining a path for the flow of fluid therethrough, the male coupling member being receivable in the female coupling member;
   (c) a plunger member having a front end and a back end and slidably mounted in the male coupling member, the plunger member being slidable movement between a closed position and an opened position, the back end of the plunger having inclined surfaces;
   (d) projections axially extending from the back end of the male coupling member, the projections slidably cooperating with the inclined surfaces of the plunger member to bias the plunger member into the closed position;
   (e) means for maintaining the male coupling member and the female coupling in a coupled state; and
   (f) first seal means for providing a fluid tight seal between the plunger member and the male coupling member when the plunger member is in the closed state and second seal means for providing a fluid tight seal between the male coupling member and the female coupling member when in the coupled state.

8. A coupling assembly in accordance with claim 7, wherein the back end of the plunger member has a conical configuration.

9. A coupling assembly in accordance with claim 8, wherein the back end of the plunger member has at least two different inclined surfaces.

* * * * *